UNITED STATES PATENT OFFICE 1,955,998

HYDROGENATION PRODUCT FROM 2.2'-DIHYDROXY- AND 2.2'-DI-O-ACYL-1.1'-DI-NAPHTHYL

Karl Zahn and Heinrich Koch, Frankfort-on-the-Main-Hochst, Germany, assignors to General Aniline Works, Inc., New York, N. Y., a corporation of Delaware No Drawing. Application June 16, 1933, Serial No. 676,204. In Germany June 30, 1932

3 Claims. (Cl. 260—107)

The present invention relates to the preparation of hydrogenation products from 2.2'-dihydroxy- and 2.2'-di-O-acyl-1.1'-dinaphthyl, more particularly it relates to new compounds of the general formula:

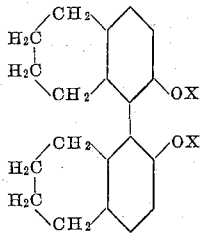

wherein the X's stand for hydrogen or for acyl radicals.

We have found that a new and uniform octohydro compound, i. e. ar-octohydro-2.2'-dihydroxy-1.1'-dinaphthyl, and its O-acyl derivatives are obtainable by treating 2.2'-dihydroxy-1.1'-dinaphthyl or an O-acyl-derivative thereof, which compounds may be represented by the general formula:

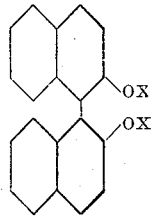

wherein the X's stand for hydrogen or for acyl radicals, with hydrogen in the presence of a hydrogenation catalyst.

The smooth course of the hydrogenation and the formation of a uniform octo-hydro product are surprising as it could be expected that unsymmetrical or non-uniform hydrogenation products would result. The hydrogenation may be carried out by causing hydrogen to act on the starting material, for instance, the free dihydroxy compound or the di-alkali metal salt or any O-acyl compound thereof, under superatmospheric pressure in the presence of a hydrogenation catalyst, such as a nickel catalyst, and in a suitable diluent or solvent, such as ethyl alcohol or water etc. As stated above the free dihydroxy compound or a metal salt thereof or any o-acyl compound, such as the di-formyl-di-acetyl, di-propionyl, di-benzoyl, di-naphthoyl or any other acyl compound, are suitable starting materials for the preparation of the ar-octohydro compounds defined.

The 2.2'-dihydroxy-1.1'-dinaphthyl-ar-octohydride compounds thus formed are valuable intermediate products for the preparation of dyestuffs. The free dihydroxy compound, for instance, is capable of being coupled with diazo compounds and thus allows the preparation of tetrazo dyestuffs.

The following examples serve to illustrate the invention, but they are not intended to limit it thereto, the parts being by weight:

(1) 37 parts of the diacetyl compound of 2.2'-dihydroxy-1.1'-dinaphthyl are hydrogenated at 110° C. to 120° C. under a hydrogen pressure of 30–50 atmospheres, in an autoclave provided with a stirrer, in 130 parts of ethyl alcohol with 2 parts of a nickel catalyst (obtainable, for instance, by reducing nickel carbonate which has been precipitated on a carrier, such as powdered pumice stone, in a stream of hydrogen at a temperature of about 500° C. to about 600° C.) until the quantity of hydrogen necessary for the formation of the octohydride—i. e. about 0.8 part—has been absorbed. The catalyst is then separated, while hot, by filtration and the hydrogenated diacetyl compound which precipitates from the filtrate on cooling, is isolated in the usual manner. It forms white crystals melting at 112° C. to 113° C. and corresponds to the following formula:

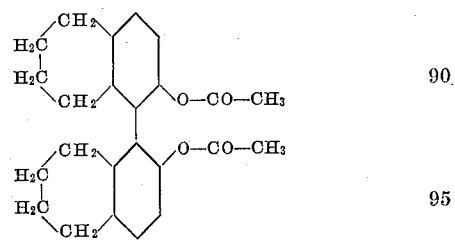

By saponifying the diacetyl compound thus obtained in the usual manner by means of alkali, both acetyl groups are split off and the 2.2'-dihydroxy-1.1'-dinaphthyl-ar-octohydride of the following formula:

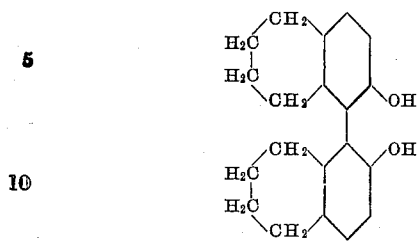

is thus obtained with a good yield. The product, when recrystallized from methanol and dried, melts at 139° C. to 140° C.

In the above example the di-acetyl compound may be replaced by other acyl compounds as, for instance, by the di-formyl-, di-benzoyl- or di-naphthoyl compound.

(2) 28.6 parts of 2.2'-dihydroxy-1.1'-dinaphthyl are hydrogenated in the form of the disodium salt or dipotassium salt in 250 parts of water with 3 parts of a nickel catalyst at 110° C. to 130° C. under a hydrogen pressure of 30 to 50 atmospheres in an autoclave provided with a stirrer. When the absorption of the hydrogen is finished, the catalyst is separated by filtration with suction. A small quantity of a product which is insoluble in alkali is obtained. It is separated and the alkaline solution is acidified. The white flakes which have been precipitated are filtered by suction and recrystallized from methanol. The product thus obtained is identical with that described in Example 1.

(3) 28.6 parts of 2.2'-dihydroxy-1.1'-dinaphthyl are hydrogenated at 110° C. to 120° C. under a hydrogen pressure of 30–50 atmospheres, in an autoclave provided with a stirrer, in 200 parts of isopropyl alcohol with 3 parts of a nickel catalyst. When the quantity of hydrogen necessary for the formation of the octohydride is absorbed, the catalyst is separated by filtration. The 2.2'-dihydroxy-1.1'-dinaphthyl-ar-octohydride crystallizes with a good yield from the concentrated solution in the form of coarse crystals. When the product is dried, it melts at 139° C. to 140° C.

As solvent there may also be used methyl alcohol or ethyl alcohol.

We claim:

1. The compounds of the general formula:

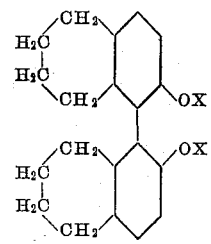

wherein the X's stand for hydrogen or for acyl radicals, which compounds are colorless crystalline products.

2. The compound of the formula:

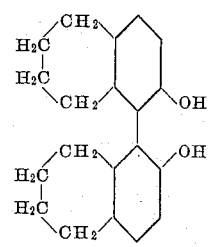

being a white crystalline product of a melting point of 139° C. to 140° C.

3. The compound of the formula:

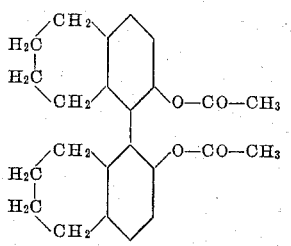

being a white crystalline product of a melting point of 112° C. to 113° C.

KARL ZAHN.
HEINRICH KOCH.